(12) United States Patent
Pearce (10) Patent No.: US 7,666,341 B2
(45) Date of Patent: Feb. 23, 2010

(54) SCREED MOLD METHOD

(75) Inventor: Tony M. Pearce, Alpine, UT (US)

(73) Assignee: TNT Holdings, LLC, Alpine, UT (US)

( * ) Notice: Subject to any disclaimer, the term of this patent is extended or adjusted under 35 U.S.C. 154(b) by 818 days.

(21) Appl. No.: 10/775,043

(22) Filed: Feb. 7, 2004

(65) Prior Publication Data
US 2005/0173836 A1 Aug. 11, 2005

(51) Int. Cl.
B29C 45/00 (2006.01)
B29C 45/18 (2006.01)
B29C 45/20 (2006.01)
B29C 45/26 (2006.01)

(52) U.S. Cl. .......................... 264/328.11; 264/328.15; 264/331.11

(58) Field of Classification Search .............. 264/328.1, 264/328.12, 328.15, 331.11, 328.11
See application file for complete search history.

(56) References Cited

U.S. PATENT DOCUMENTS

| | | |
|---|---|---|
| 5,069,540 A | 12/1991 | Gonder |
| 5,789,032 A | 8/1998 | LeCong et al. |
| 5,868,597 A | 2/1999 | Chen |
| 5,938,499 A | 8/1999 | Chen |
| 5,947,918 A | 9/1999 | Jones et al. |
| 5,962,572 A | 10/1999 | Chen |
| 6,033,283 A | 3/2000 | Chen |
| 6,050,871 A | 4/2000 | Chen |
| 6,148,830 A | 11/2000 | Chen |
| 6,187,232 B1 | 2/2001 | Chaudhary et al. |
| 6,264,860 B1 | 7/2001 | Attar |
| 6,280,178 B1 * | 8/2001 | Khan .................... 425/573 |
| 6,286,448 B1 * | 9/2001 | Sahr et al. ................ 114/357 |
| 6,299,817 B1 | 10/2001 | Parkinson |
| 6,324,703 B1 | 12/2001 | Chen |
| 6,333,374 B1 | 12/2001 | Chen |
| 6,369,120 B1 | 4/2002 | Chaudhary et al. |
| 2004/1015538 * | 8/2004 | Johnson et al. .......... 264/511 |

* cited by examiner

Primary Examiner—Leo B Tentoni
(74) Attorney, Agent, or Firm—TrastBritt (57) ABSTRACT

A screed mold method for continuously or periodically molding thermoplastic material into a cushioning element is disclosed.

30 Claims, 3 Drawing Sheets

SCREED MOLD METHOD

BACKGROUND

This disclosure relates to manufacturing processes using open-faced molds that are useful in manufacturing moldable materials, such as thermoplastic materials, and are particularly useful in manufacturing elastomeric articles including articles comprising elastomeric gel. The methods and structures are especially useful in open-face molding of materials that are of high viscosity or otherwise have a difficulty in flowing into the cavities of an open-faced mold.

SUMMARY

Screed molding methods are disclosed.

DETAILED DESCRIPTION

Figure 1:
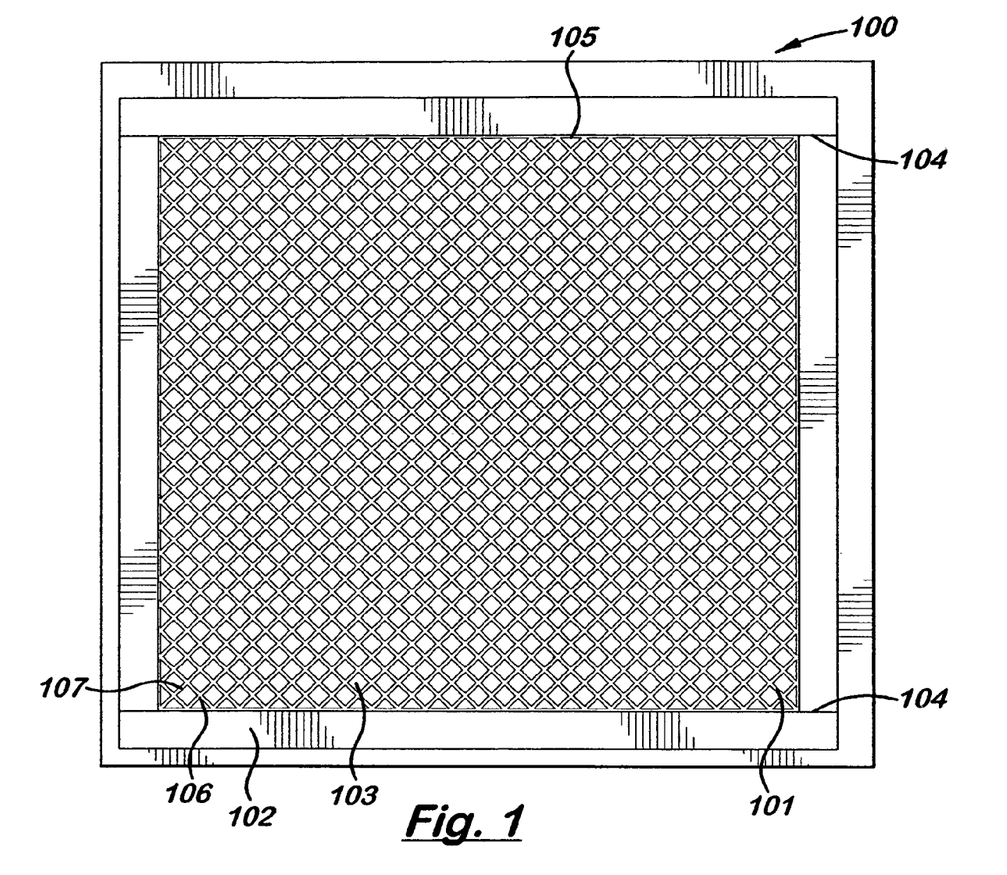
FIGS. 1 and 1A depict an example screed mold.

FIG. 1 depicts the top face of an open faced mold 100, in this case, an open faced mold for a mattress topper. The mold 100 is one component of an embodiment. The open faced mold 100 is further characterized as comprising a honeycomb 104. The honeycomb 104 is made up of slots 101 (perpendicularly or at other angles) crisscrossing each other from side rails 102 that surround the perimeter 105 of the honeycomb 104. Slots 101 are spaced so that square (or other shaped) mold cores 103 are distributed throughout the honeycomb 104. The mold 100 may be created in a variety of sizes for any desired size mattress. When the mattress has a foam perimeter border (not shown) of approximately 15 cm, the gel honeycomb 104 would have a length of about 170 cm and a width of about 120 cm. In this embodiment, the slots 101 have a depth of about 7 cm and the mold cores 103 concurrently have a height of 7 cm.

Figure 1A:
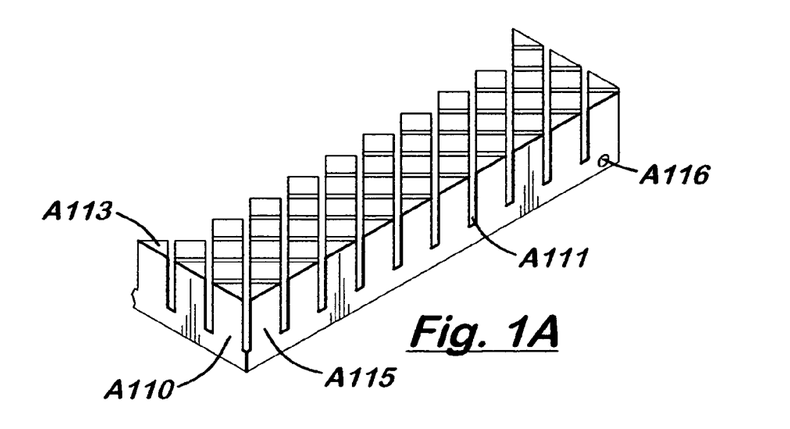

In one embodiment, the mold 100 is made of a metal plate A110 as depicted in FIG. 1A. The slots A111 may be manufactured in the mold 100 by machining with a circular saw blade (or other cutting tool) about 80% through the thickness of a metal plate A110 forming mold cores A113. In other embodiments, the mold 100 may be made of a non-deforming polymer such as plastic . . . , wood, ceramic or other material not subject to deformation at the temperature of injection. After slots A111 are machined, the perimeter A115 is milled off, to 80% or up to 100% depth. Bolt holes A116 are drilled in the metal plate A110.

Referring again to FIG. 1, mold 100 can be bolted or otherwise affixed to four side rails 102. Side rails 102 may be made of various materials including metallic and non-metallic materials. Aluminum may be used in one embodiment for quick heating and cooling. In another embodiment, steel can serve as an appropriate material for the side rails 102. In still another embodiment, non-metallic materials could be used.

As shown in FIG. 1, the honeycomb 104 displays a pattern for slots 101. As an example, slots 101 form a 45 degree angle with the perimeter 105 of the mold 100. In this "x" configuration, thermoplastic material (not shown) that is introduced into the mold with a flow path in the "up" direction of FIG. 1 can easily flow around the mold cores 103. In an alternative embodiment, slots 101 form a 90 degree angle with the perimeter 105 to form a "+" configuration. A gel honeycomb 104 in the "x" configuration results in the injected material meeting at a corner 106 instead of a center 107 of a mold core 103 and then continuing to flow around an adjacent core. In contrast, the inventors' experience with the "+" configuration results in molten material meeting at a center 107 of a mold core 103. When the molten material fills the honeycomb 104 in this manner, knit lines might be introduced in the molded part, which can weaken the part.

Figure 2:
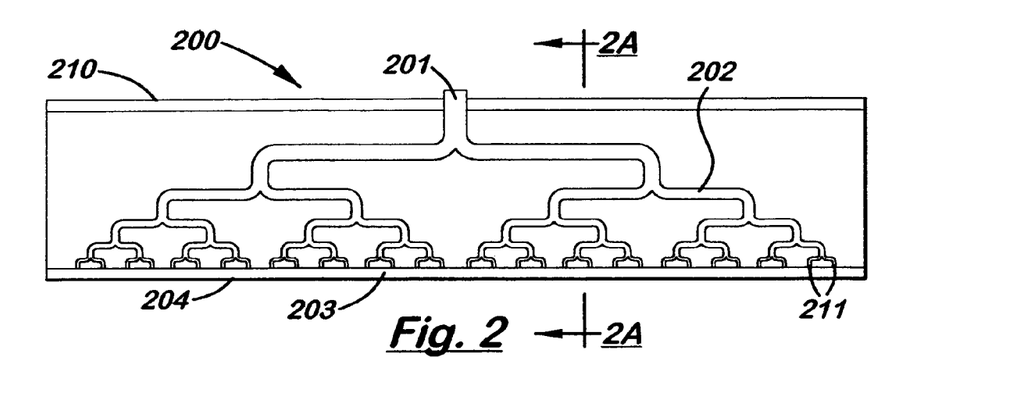
FIGS. 2, 2A and 2B depict other views of an example screed mold.

Another component in the embodiments is depicted in FIG. 2. FIG. 2. shows a cross sectional view of injection head 200. Injection head 200 comprises a top face 210 and a bottom face 204. In the top face 210, an inlet 201 opens to a network of distribution channels 202. Molten material (not shown) enters the inlet 201 and flows throughout distribution channels 202 until the material exits outlets 211 at the bottom face 204 and into slot 203. The distribution channel begins at the inlet 201 as one channel and divides into two channels symmetrically.

The distribution channels 202 can divide again and again until there are several channels. The more frequently the channels divide, the more outlets 211 will appear in the slot 203. The advantage of increasing the number of outlets 211 is that it allows for more uniform distribution of molten material into the slot 203. As depicted in FIG. 2, the distribution channels in one embodiment divide with uniform frequency and with uniform distribution of outlets.

Figure 2A:
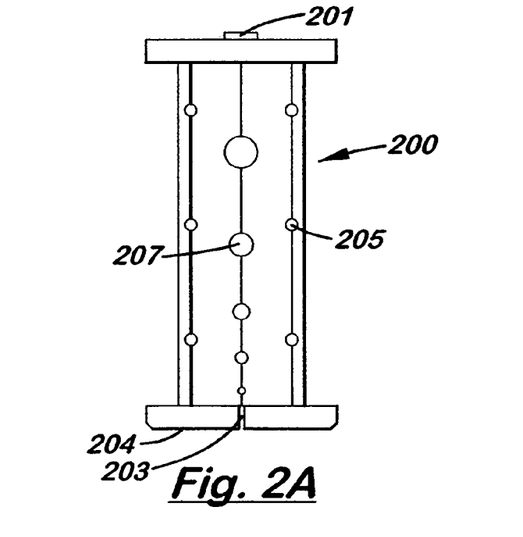
Figure 2B:
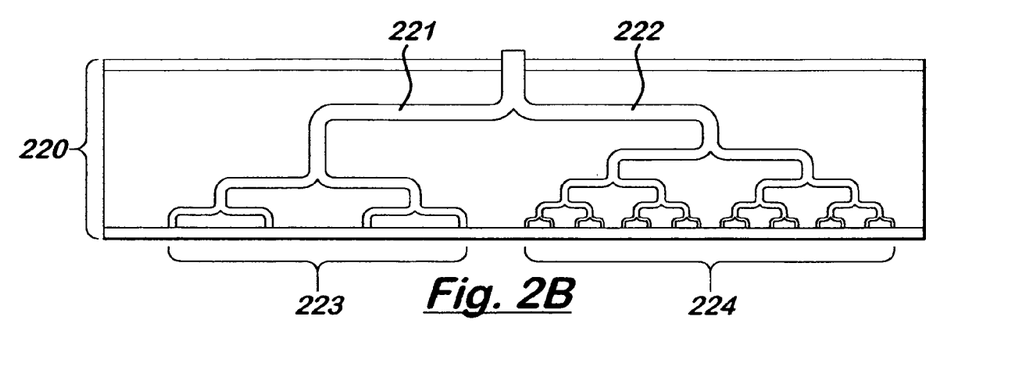

In another embodiment, depicted in FIG. 2B, distribution channels do not divide with uniform frequency and uniformity of distribution outlets. In this embodiment, molten material flows through distribution head 220 more readily to distribution channel 221 and less readily to distribution channel 222. When the injection head 220 is configured in this way, an uneven distribution of molten material can be applied to a suitable mold that has an uneven requirement for injected material. One skilled in the art can appreciate that a side of a mold with greater material volume demands could be fed by outlets 223 coming from distribution channel 221 and a side of a mold with lesser material volume demands can be fed by outlets 224 coming from distribution channel 222. By way of example, if the product to be molded is thicker in the center and thinner along the edges, greater material flow is desired in the center than along the edges. Larger exit holes and/or more exit holes in a particular area of the head would facilitate greater flow in that area of the head. Those skilled in the art of extrusion dies will appreciate how to control flow in the head. Optimally, the head should be constructed so that there are no dead spots where flow stops and material collects. It is important to have continuous flow of molten material so that when the head is heated, there is no non-moving material to degrade over time.

Referring to FIG. 2A, wherein a distribution head 200 is depicted as a cross-sectional side view, distribution channels 202 are shown as cross-sectional tubes 207. Heating elements and/or cooling channels 205 are distributed throughout the distribution head 200 to heat or maintain the temperature of the molten materials as it passes through the distribution channels 202. The heating elements may be fixed cartridges in the distribution head or may also be circulating tubes through which a heated fluid may pass through. Cooling channels are circulating tubes through which a cooled fluid may pass.

In other embodiments, the distribution head can be simplified so that the molten material is pumped into a single heated reservoir within a head and exits at drilled holes along the length of the reservoir.

In another aspect of the embodiments, the distribution head 200 acts as a screed. A screed levels off a surface. These surfaces may be horizontal or vertical or any other angle, and may be flat or contoured.

Process Steps

A process for molding thermoset parts, thermoplastic parts, or gelatinous elastomer parts is also described. The first step in the process requires a pumping source (typically an extruder) to push a flowable material (typically thermosettable liquid and more typically molten thermoplastic) into a flow-distributing head. The flowable material exits the flow-distributing head at multiple ports into an open-faced mold. The flow-distributing head and open-faced mold must be relatively flush with one another. The flow-distributing head and the open-faced mold are passed relative to each other as the flowable material is distributed into the mold. As the two components move within close proximity, the head serves as a screed. The head screeds molten material from the top of the mold leaving most of the material only in the mold's cavities.

In one aspect of the methods and structures, the distance between the flow-distributing head and the open-faced mold can be adjusted. With greater distances between the head and the mold, an excess of flowable material increases the thickness of the layer intended to be a permanent part of the molded product. Likewise, when smaller distances stand between the head and the mold, the amount of molten material decreases and the layer thins on the molded product. An advantage of the methods and structures when the head and mold are in close proximity enables additional pressure of the molten material in the cavities of the mold completely filling the mold and strengthening knit line interfaces. The pressure drives even high-viscosity or low-flow materials into the cavities of the mold. Furthermore, the number and degree of knit lines are less of a problem in the methods and structures because in the screeding process, the molten material is better mixed.

In one embodiment, mold 100 moves beneath head 200 in close proximity. Concomitantly, molten material is pumped into head 200 at inlet 201 and passes through flow distribution channels 202. Both the molten material and head 200 are heated by cartridge heaters 205. The molten material exits the head 200 (also referred to as a "screed head") at outlets 211 into slot 203. Molten material in slot 203 thus flows into the slots 101 of mold 100 in a uniform fashion. As mattress mold 100 moves beneath head 200, the molten gel fills slots 101 and the flow front continues to fill slots 101 progressively. The proximity of the bottom face 204 of head 200 to mold 100 should be minimized as much as possible given the constraints of machining tolerances so as to minimize the skin that forms on the top of mold 100. The skin may be scraped off before the gel cools and resolidifies. Alternatively, if a skin is desired as part of the finished product, the proximity of head 200 to mold 100 should be about the thickness of the desired skin.

After one application process, the mold would be cooled, typically by water. Likewise, the part cast in the mold is cooled and removed by grabbing and stretching it until the part separates from mold 100. In the case of more rigid thermoplastic materials, mold 100 can be transferred to a station that has ejector pins driving the part out of mold 100.

In yet another aspect of the methods and structures, it is desirable to affix a fabric or other base material to one side of the gel structure. This is accomplished by machining an appropriate mold. The mold is prepared similar to the prior described mold by making cuts all the way through a metal piece (the I-shaped slots) instead of the 80% cut previously described. A fabric is placed between the mold and the platform on which the mold is placed during the molding process. Thus, the molten thermoplastic or cross-linkable liquid or etc. goes from the head completely through the mold and stops at the fabric. The molded material seals itself to the fabric and remains sealed once the material is solidified. In this case, the part must be demolded from the fabric side. The design of the molded part must be such that the mold remains intact while machining 100% through the thickness.

Figure 3:
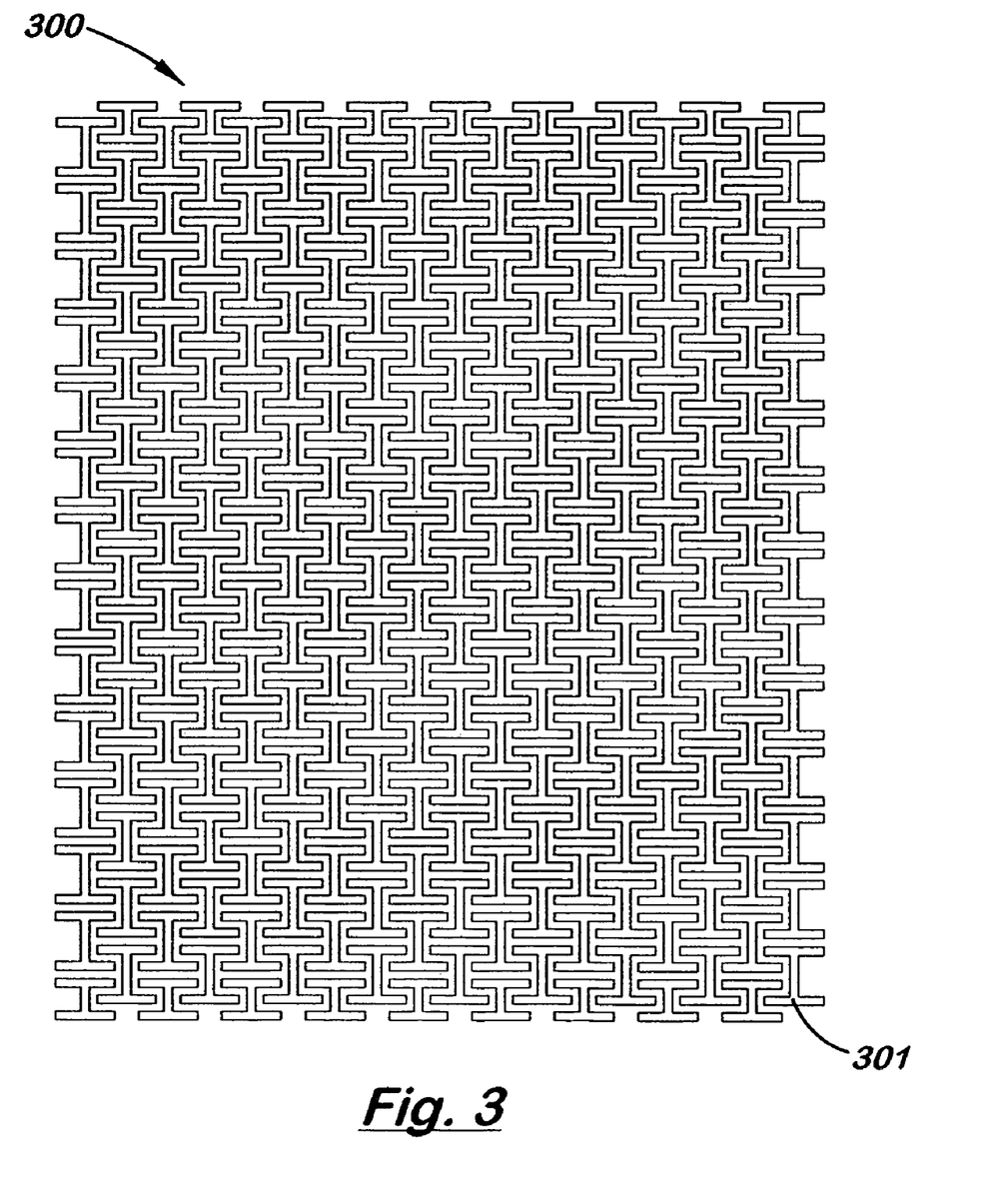
FIG. 3 depicts an example gel mattress component made by a screed mold method.

Referring to FIG. 3, which shows a top view of an I-beam shaped gel mattress manufactured by the method described herein, gel mattress 300 is made up of I-beam shaped gel members 301. The mold remains intact as the separate I-beam shapes 301 are machined. In other molding situations, attaching fabric or other base material of any type can be accomplished by laying the material under the mold before sending the mold under the flowing head.

In another embodiment, fabric that is permeable to the flowable material can be placed on the top of the mold. Such fabric may be non-woven, mesh, or screen fabrics. When the flowable material is placed on the top of the mold with a permeable fabric, then material can flow from the head through the fabric. The resulting part is cooled or otherwise solidified and removed from the mold with the fabric intact. Generally, the fabric will have material coating it. This method allows fabric to be molded onto the part during the process without having the restrictions on mold configuration incurred by machining 100% through the part.

In yet another aspect of the methods and structures, a continuous molding operation is described. Thermoplastic parts can be molded continuously according to the methods and structures. The parts can be rolled up or cut off at intervals. In one embodiment, the leading edge and the trailing edge of each discrete mold are open in such a manner that the trailing edge of the first mold mates in physical fashion with the leading edge of the second mold. In turn, the trailing edge of the second mold mates in physical fashion with the leading edge of the third mold. This linear compatibility may be continued until the last mold is reached and the product or string of products terminate at the trailing edge of the last mold in the series or, alternatively, the leading edge of the first mold mates with the trailing edge of last linear mold.

In another embodiment of the methods and structures, a second continuous molding operation is described. In this operation, continuous parts are generated by molds situated in a continuous loop. The molds might be described as traveling around the loop like treads of a tracked vehicle such as a tank. Molds in this configuration would be end to end and flat with one another during the top and bottom phases of the loop sequence and would separate somewhat as they went around a curve in the loop from top to bottom and then from bottom to top.

In yet another embodiment of the methods and structures, a third continuous molding operation is described and is particularly useful for flexible thermoplastics. In this operational mode, the mold is made in the form of a cylinder with an open-faced mold being on the outer surface of the cylinder and a screed head reasonably flush with the outer surface. In some instances, the bottom face of the screed head may need to be more curved than planar to facilitate appropriate relative distances between the screed head and the mold face. For many applications of this mode, a planar bottom face will suffice. As the cylinder rotates, the screed head remains stationary.

In many of the embodiments described, the screed head (also referred to as a "distribution head") may be kept stationary and the mold is made to move relative to the head. In other embodiments, the screed head is kept stationary while the mold is moved.

In yet another aspect of the methods and structures, the molds may be preheated before being cast with molten thermoplastic materials.

Materials or Material Formulations

The material to be molded may be any material that is flowable during molding and can be solidified within the mold cavities. This includes thermoplastics, resins, thermoset resins, cements, and plasters, without limitation to these categories. It is useful for thermoplastic gelatinous elastomer materials.

a. Elastomer Component

The compositions of the materials for use in the methods and structures may be low durometer (as defined below) thermoplastic gelatinous elastomeric compounds and viscoelastomeric compounds that include a principle polymer component, an elastomeric block copolymer component, and a plasticizer component.

The elastomer component of the gel material may include a triblock polymer of the general configuration A-B-A, wherein the A represents a desired polymer such as a monoalkenylarene polymer including, but not limited to, polystyrene and functionalized polystyrene, and the B is an elastomeric polymer such as polyethylene, polybutylene, poly(ethylene/butylene), hydrogenated poly(isoprene), hydrogenated poly(butadiene), hydrogenated poly(isoprene+butadiene), poly(ethylene/propylene) or hydrogenated poly(ethylene/butylene+ethylene/propylene), or others. The A components of the material link to each other to provide strength, while the B components provide elasticity. Polymers of greater molecular weight are achieved by combining many of the A components in the A portions of each A-B-A structure and combining many of the B components in the B portion of the A-B-A structure, along with the networking of the A-B-A molecules into large polymer networks.

An example elastomer for making the example gel material is a very high to ultra high molecular weight elastomer and oil compound having an extremely high Brookfield Viscosity (hereinafter referred to as "solution viscosity"). Solution viscosity is generally indicative of molecular weight. "Solution viscosity" is defined as the viscosity of a solid when dissolved in toluene at 25° C. to 30° C., measured in centipoises (cps). "Very high molecular weight" is defined herein in reference to elastomers having a solution viscosity, 20 weight percent solids in 80 weight percent toluene, the weight percentages being based upon the total weight of the solution, from greater than about 20,000 cps to about 50,000 cps. An "ultra high molecular weight elastomer" is defined herein as an elastomer having a solution viscosity, 20 weight percent solids in 80 weight percent toluene, of greater than about 50,000 cps. Ultra high molecular weight elastomers have a solution viscosity, 10 weight percent solids in 90 weight percent toluene, the weight percentages being based upon the total weight of the solution, of about 800 to about 30,000 cps and greater. The solution viscosities, in 80 weight percent toluene, of the A-B-A block copolymers useful in the elastomer component of the example gel cushioning material are substantially greater than 30,000 cps. The solution viscosities, in 90 weight percent toluene, of the example A-B-A elastomers useful in the elastomer component of the example gel are in the range of about 2,000 cps to about 20,000 cps. Thus, the example elastomer component of the example gel material has a very high to ultra high molecular weight.

Applicant has discovered that after surpassing a certain optimum molecular weight range, some elastomers exhibit lower tensile strength than similar materials with optimum molecular weight copolymers. Thus, merely increasing the molecular weight of the elastomer will not always result in increased tensile strength.

The elastomeric B portion of the example A-B-A polymers has an exceptional affinity for most plasticizing agents including, but not limited to, several types of oils, resins, and others. When the network of A-B-A molecules is denatured, plasticizers that have an affinity for the B block can readily associate with the B blocks. Upon renaturation of the network of A-B-A molecules, the plasticizer remains highly associated with the B portions, reducing or even eliminating plasticizer bleed from the material when compared with similar materials in the prior art, even at very high oil:elastomer ratios. The reason for this performance may be any of the plasticization theories explained above (i.e., lubricity theory, gel theory, mechanistic theory, and free volume theory).

The elastomer used in the example gel cushioning medium is preferably an ultra high molecular weight polystyrene-hydrogenated poly(isoprene+butadiene)-polystyrene, such as those sold under the brand names SEPTON 4045, SEPTON 4055 and SEPTON 4077 by Kuraray Co., Ltd., Okayama, Japan, an ultra high molecular weight polystyrene-hydrogenated polyisoprene-polystyrene such as the elastomers made by Kuraray and sold as SEPTON 2005 and SEPTON 2006, or an ultra high molecular weight polystyrene-hydrogenated polybutadiene-polystyrene, such as that sold as SEPTON 8006 by Kuraray. High to very high molecular weight polystyrene-hydrogenated poly(isoprene+butadiene)-polystyrene elastomers, such as that sold under the trade name SEPTON 4033 by Kuraray, are also useful in some formulations of the example gel material because they are easier to process than the example ultra high molecular weight elastomers due to their effect on the melt viscosity of the material.

Following hydrogenation of the midblocks of each of SEPTON 4033, SEPTON 4045, SEPTON 4055, and SEPTON 4077, less than about five percent of the double bonds remain. Thus, substantially all of the double bonds are removed from the midblock by hydrogenation.

Applicant's most example elastomer for use in the example gel is SEPTON 4055 or another material that has similar chemical and physical characteristics. SEPTON 4055 has the optimum molecular weight (approximately 300,000, as determined by Applicant's gel permeation chromatography testing). SEPTON 4077 has a somewhat higher molecular weight, and SEPTON 4045 has a somewhat lower molecular weight than SEPTON 4055. Materials that include either SEPTON 4045 or SEPTON 4077 as the primary block copolymer typically have lower tensile strength than similar materials made with SEPTON 4055.

Kuraray Co., Ltd., of Okayama, Japan, has stated that the solution viscosity of SEPTON 4055, the most example A-B-A triblock copolymer for use in the example gel material, 10% solids in 90% toluene at 25° C., is about 5,800 cps. Kuraray also said that the solution viscosity of SEPTON 4055, 5% solids in 95% toluene at 25° C., is about 90 cps. Although Kuraray has not provided a solution viscosity, 20% solids in 80% toluene at 25° C., an extrapolation of the two data points given shows that such a solution viscosity would be about 400,000 cps. Applicant reads the prior art as consistently teaching away from such high solution viscosities.

Applicant confirmed Kuraray's data by having an independent laboratory, SGS U.S. Testing Company Inc. of Fairfield, NJ, test the solution viscosity of SEPTON 4055. When SGS attempted to dissolve 20% solids in 80% toluene at 25° C., the resulting material did not resemble a solution. Therefore, SGS determined the solution viscosity of SEPTON 4055 using 10% solids in 90% toluene at 25° C., which resulted in a 3,040 cps solution.

Other materials with chemical and physical characteristics similar to those of SEPTON 4055 include other A-B-A triblock copolymers that have a hydrogenated midblock polymer that is made up of at least about 30% isoprene monomers and at least about 30% butadiene monomers, the percentages being based on the total number of monomers that make up the midblock polymer. Similarly, other A-B-A triblock copolymers that have a hydrogenated midblock polymer that is made up of at least about 30% ethylene/propylene monomers and at least about 30% ethylene/butylene monomers, the percentages being based on the total number of monomers that make up the midblock polymer, are materials with chemical and physical characteristics similar to those of SEPTON 4055.

Mixtures of block copolymer elastomers are also useful as the elastomer component of some of the formulations of the example gel cushioning medium. In such mixtures, each type of block copolymer contributes different properties to the material. For example, high strength triblock copolymer elastomers are desired to improve the tensile strength and durability of a material. However, some high strength triblock copolymers are very difficult to process with some plasticizers. Thus, in such a case, block copolymer elastomers that improve the processability of the materials are desirable.

In particular, the process of compounding SEPTON 4055 with plasticizers may be improved via a lower melt viscosity by using a small amount of more flowable elastomer such as SEPTON 8006, SEPTON 2005, SEPTON 2006, or SEPTON 4033, to name only a few, without significantly changing the physical characteristics of the material.

In a second example of the usefulness of block copolymer elastomer mixtures in the example gel materials, many block copolymers are not good compatibilizers. Other block copolymers readily form compatible mixtures, but have other undesirable properties. Thus, the use of a small amount of elastomers that improve the uniformity with which a material mixes are desired. KRATON G 1701, manufactured by Shell Chemical Company of Houston, TX, is one such elastomer that improves the uniformity with which the components of the example gel material mix.

Many other elastomers including, but not limited to, triblock copolymers and diblock copolymers are also useful in the example gel material. Applicant believes that elastomers having a significantly higher molecular weight than the ultra-high molecular weight elastomers useful in the example gel material increase the softness thereof, but decrease the strength of the gel. Thus, high to ultra high molecular weight elastomers, as defined above, are desired for use in the example gel material due to the strength of such elastomers when combined with a plasticizer.

b. Additives i. Polarizable Plasticizer Bleed-Reducing Additives

Preferably, the gel materials used in the cushions of the methods and structures do not exhibit migration of plasticizers, even when placed against materials that readily exhibit a high degree of capillary action, such as paper, at room temperature.

An example plasticizer bleed-reducing additive that is useful in the example gel cushioning material includes hydrocarbon chains with readily polarizable groups thereon. Such polarizable groups include, without limitation, halogenated hydrocarbon groups, halogens, nitrites, and others. Applicant believes that the polarizability of such groups on the hydrocarbon molecule of the bleed-reducing additive have a tendency to form weak van der Waals bonding with the long hydrocarbon chains of the rubber portion of an elastomer and with the plasticizer molecules. Due to the great length of typical rubber polymers, several of the bleed-reducers will be attracted thereto, while fewer will be attracted to each plasticizer molecule. The bleed-reducing additives are believed to hold the plasticizer molecules and the elastomer molecules thereto, facilitating attraction between the elastomeric block and the plasticizer molecule. In other words, the example bleed-reducing additives are believed to attract a plasticizer molecule at one polarizable site, while attracting an elastomeric block at another polarizable site, thus maintaining the association of the plasticizer molecules with the elastomer molecules, which inhibits exudation of the plasticizer molecules from the elastomer-plasticizer compound. Thus, each of the plasticizer molecules is preferably attracted to an elastomeric block by means of a bleed-reducing additive.

The example bleed-reducing additives that are useful in the example gel material have a plurality of polarizable groups thereon, which facilitate bonding an additive molecule to a plurality of elastomer molecules and/or plasticizer molecules. It is believed that an additive molecule with more polarizable sites thereon will bond to more plasticizer molecules. Preferably, the additive molecules remain in a liquid or a solid state during processing of the gel material.

The most example bleed-reducing additives for use in the example gel material are halogenated hydrocarbon additives such as those sold under the trade name DYNAMAR PPA-791, DYNAMAR PPA-790, DYNAMAR FX-9613, and FLUORAD FC 10 Fluorochemical Alcohol, each by 3M Company of St. Paul, MN. Other additives are also useful to reduce plasticizer exudation from the example gel material. Such additives include, without limitation, other halogenated hydrocarbons sold under the trade name FLUORAD including, without limitation, FC-129, FC-135, FC-430, FC-722, FC-724, FC-740, FX-8, FX-13, FX-14 and FX-189; halogenated hydrocarbons such as those sold under the trade name ZONYL including, without limitation, FSN 100, FSO 100, PFBE, 8857A, BA-L, BA-N, TBC and FTS, each of which are manufactured by du Pont of Wilmington, DE; halogenated hydrocarbons sold under the trade name EMCOL by Witco Corp of Houston, TX, including, without limitation, 4500 and DOSS; other halogenated hydrocarbons sold by 3M under the trade name DYNAMAR; chlorinated polyethylene elastomer (CPE), distributed by Harwick, Inc. of Akron, OH; chlorinated paraffin wax, distributed by Harwick, Inc.; and others.

ii. Detackifiers

The example material may include a detackifier. Tack is not a desirable feature in many potential uses for the cushions of the methods and structures. However, some of the elastomeric copolymers and plasticizers useful in the example cushioning media for the cushioning elements of the methods and structures may impart tack to the media.

Soaps, detergents and other surfactants have detackifying abilities and are useful in the example gel material. "Surfactants," as defined herein, refers to soluble surface active agents that contain groups that have opposite polarity and solubilizing tendencies. Surfactants form a monolayer at interfaces between hydrophobic and hydrophilic phases, and when not located at a phase interface, surfactants form micelles. Surfactants have detergency, foaming, wetting, emulsifying and dispersing properties. D.W.A. Sharp, DICTIONARY OF CHEMISTRY, 381-82 (Penguin, 1990). For example, coco diethanolamide, a common ingredient in shampoos, is useful in the example gel material as a detackifying agent. Coco diethanolamide resists evaporation, is stable, relatively non-toxic, non-flammable and does not support microbial growth. Many different soap or detergent compositions could be used in the material as well.

Other known detackifiers include glycerin, epoxidized soybean oil, dimethicone, tributyl phosphate, block copolymer polyether, diethylene glycol mono oleate, tetraethyleneglycol dimethyl ether, and silicone, to name only a few. Glycerine is available from a wide variety of sources. Witco Corp. of Greenwich, CN, sells epoxidized soybean oil as DRAPEX 6.8. Dimethicone is available from a variety of vendors including GE Specialty Chemicals of Parkersburg, WV, under the trade name GE SF 96-350. C.P. Hall Co. of Chicago, IL, markets block copolymer polyether as PLURONIC L-61. C.P. Hall Co. also manufactures and markets diethylene glycol mono oleate under the name Diglycol Oleate—Hallco CPH-I-SE. Other emulsifiers and dispersants are also useful in the example gel material. Tetraethyleneglycol dimethyl ether is available under the trade name TETRAGLYME from Ferro Corporation of Zachary, LA. Applicant believes that TETRAGLYME also reduces plasticizer exudation from the example gel material.

iii. Antioxidants

The example gel material also includes additives such as an antioxidant. Antioxidants such as those sold under the trade names IRGANOX 1010 and IRGAFOS 168 by Ciba-Geigy Corp. of Tarrytown, NY, are useful by themselves or in combination with other antioxidants in the example materials of the methods and structures.

Antioxidants protect the example gel materials against thermal degradation during processing, which requires or generates heat. In addition, antioxidants provide long term protection from free radicals. A example antioxidant inhibits thermo-oxidative degradation of the compound or material to which it is added, providing long term resistance to polymer degradation. Preferably, an antioxidant added to the example gel cushioning medium is useful in food packaging applications, subject to the provisions of 21 C.F.R. §178.2010 and other laws.

Heat, light (in the form of high energy radiation), mechanical stress, catalyst residues, and reaction of a material with impurities all cause oxidation of the material. In the process of oxidation, highly reactive molecules known as free radicals are formed and react in the presence of oxygen to form peroxy free radicals, which further react with organic material (hydro-carbon molecules) to form hydroperoxides.

The two major classes of antioxidants are the primary antioxidants and the secondary antioxidants. Peroxy free radicals are more likely to react with primary antioxidants than with most other hydrocarbons. In the absence of a primary antioxidant, a peroxy free radical would break a hydrocarbon chain. Thus, primary antioxidants deactivate a peroxy free radical before it has a chance to attack and oxidize an organic material.

Most primary antioxidants are known as sterically hindered phenols. One example of sterically hindered phenol is the $C_{73}H_{108}O_{12}$ marketed by Ciba-Geigy as IRGANOX 1010, which has the chemical name 3,5-bis(1,1-dimethylethyl)-4-hydroxybenzenepropanoic acid, 2,2-bis [[3-[3,5-bis (dimethylethyl)-4-hydroxyphenyl]-1-oxopropoxy]methyl]1, 3-propanediyl ester. The FDA refers to IRGANOX 1010 as tetrakis[methylene(3,5-di-tert-butyl-4-hydroxyhydrocinnimate)]methane. Other hindered phenols are also useful as primary antioxidants in the example material.

Similarly, secondary antioxidants react more rapidly with hydroperoxides than most other hydrocarbon molecules. Secondary antioxidants have been referred to as hydroperoxide decomposers. Thus, secondary antioxidants protect organic materials from oxidative degradation by hydroperoxides.

Commonly used secondary antioxidants include the chemical classes of phosphites/phosphonites and thioesters, many of which are useful in the example gel material. The hydroperoxide decomposer used by Applicant is a $C_{42}H_{63}O_3$ P phosphite known as Tris(2,4-di-tert-butylphenyl)phosphite and marketed by Ciba-Geigy as IRGAFOS 168.

It is known in the art that primary and secondary antioxidants form synergistic combinations to ward off attacks from both peroxy free radicals and hydroperoxides.

Other antioxidants including, but not limited to, multifunctional antioxidants, are also useful in the example material. Multifunctional antioxidants have the reactivity of both a primary and a secondary antioxidant. IRGANOX 1520 D, manufactured by Ciba-Geigy is one example of a multifunctional antioxidant. Vitamin E antioxidants, such as that sold by Ciba-Geigy as IRGANOX E17, are also useful in the example cushioning material for use in the cushions of the methods and structures.

The gel material may include up to about three weight percent antioxidant, based on the weight of the elastomer component, when only one type of antioxidant is used. The material may include as little as 0.1 weight percent of an antioxidant, or no antioxidant at all. When a combination of antioxidants is used, each may comprise up to about three weight percent, based on the weight of the elastomer component. Additional antioxidants may be added for severe processing conditions involving excessive heat or long duration at a high temperature.

Applicant believes that the use of excess antioxidants reduces or eliminates tack on the exterior surface of the example gel material. Excess antioxidants appear to migrate to the exterior surface of the material following compounding of the material. Such apparent migration occurs over substantial periods of time, from hours to days or even longer.

iv. Flame Retardants

Flame retardants may also be added to the example gel materials. Flame retardants useful in the cushioning elements of the methods and structures include, but are not limited to, diatomaceous earth flame retardants sold as GREAT LAKES DE 83R and GREAT LAKES DE 79 by Great Lakes Filter, Division of Acme Mills Co. of Detroit, MI. Most flame retardants that are useful in elastomeric materials are also useful in the example gel material. In particular, Applicant prefers the use of food grade flame retardants that do not significantly diminish the physical properties of the example gel material.

Chemical blowing agents, such as SAFOAM FP-40, manufactured by Reedy International Corporation of Keyport, NJ, and others, are useful for making a gel cushioning medium that is self-extinguishing.

v. Colorants

Colorants may also be used in the example gel materials for use in the cushions of the methods and structures. Any colorant that is compatible with elastomeric materials may be used in the materials. In particular, Applicant prefers to use aluminum lake colorants such as those manufactured by Warner Jenkinson Corp. of St. Louis, MO; pigments manufactured by Day Glo Color Corp. of Cleveland, OH; Lamp Black, such as that sold by Spectrum Chemical Manufacturing Corp. of Gardena, CA; and Titanium Dioxide (white). By using these colorants, the gel material takes on intense shades of colors including, but not limited to, pink, red, orange, yellow, green, blue, violet, brown, flesh, white and black.

vi. Paint

The example gel cushioning medium may also be painted.

Vii. Other Additives

Other additives may also be added to the example gel material. Additives such as foaming facilitators, tack modifiers, plasticizer bleed modifiers, flame retardants, melt viscosity modifiers, melt temperature modifiers, tensile strength modifiers, and shrinkage inhibitors are useful in specific formulations of the example gel material.

Melt temperature modifiers useful in the example gel include cross-linking agents, hydrocarbon resins, diblock copolymers of the general configuration A-B and triblock copolymers of the general configuration A-B-A wherein the end block A polymers include functionalized styrene monomers, and others.

Tack modifiers that tend to reduce tack and that are useful in the example gel include surfactants, dispersants, emulsifiers, and others. Tack modifiers that tend to increase the tack of the material and that are useful in the material include hydrocarbon resins, polyisobutylene, butyl rubber and others.

Foam facilitators that are useful in the gel material include polyisobutylene, butyl rubber, surfactants, emulsifiers, dispersants and others.

Plasticizer bleed modifiers that tend to reduce plasticizer exudation from the example material and that are useful therein include hydrocarbon resins, elastomeric diblock copolymers, polyisobutylene, butyl rubber, transpolyoctenylene rubber ("tor rubber"), and others.

Flame retardants useful in the example gel include halogenated flame retardants, non-halogenated flame retardants, and volatile, non-oxygen gas forming chemicals and compounds.

Melt viscosity modifiers that tend to reduce the melt viscosity of the pre-compounded component mixture of the example cushioning medium include hydrocarbon resins, transpolyoctenylene rubber, castor oil, linseed oil, non-ultra high molecular weight thermoplastic rubbers, surfactants, dispersants, emulsifiers, and others.

Melt viscosity modifiers that tend to increase the melt viscosity of the pre-compounded component mixture of the example gel material include hydrocarbon resins, butyl rubber, polyisobutylene, additional triblock copolymers having the general configuration A-B-A and a molecular weight greater than that of each of the block copolymers in the elastomeric block copolymer component of the material, particulate fillers, microspheres, butadiene rubber, ethylene/propylene rubber, ethylene/butylene rubber, and others.

Tensile strength modifiers that tend to increase the tensile strength of the example gel material for use in the cushions of the methods and structures include mid block B-associating hydrocarbon resins, non-end-block solvating hydrocarbon resins that associate with the end blocks, particulate reinforcers, and others.

Shrinkage inhibitors, which tend to reduce shrinkage of the gel material following compounding, that are useful in the material include hydrocarbon resins, particulate fillers, microspheres, transpolyoctenylene rubber, and others.

c. Microspheres

Microspheres may also be added to the example gel material. The gel material may contain up to about 90% microspheres, by volume. In one example microsphere-containing formulation of the example gel material, microspheres make up at least about 30% of the total volume of the material. A second example microsphere-containing formulation of the example gel cushioning medium includes at least about 50% microspheres, by volume.

Different types of microspheres contribute various properties to the material. For example, hollow acrylic microspheres, such as those marketed under the brand name MICROPEARL, and generally in the 20 to 200 micron size range, by Matsumoto Yushi-Seiyaku Co., Ltd. of Osaka, Japan, lower the specific gravity of the material. In other formulations of the gel, the microspheres may be unexpanded DU(091-80), which expand during processing of the example gel cushioning medium, or pre-expanded DE (091-80) acrylic microspheres from Expancel Inc. of Duluth, GA.

In formulations of the example material, which include hollow acrylic microspheres, the microspheres preferably have substantially instantaneous rebound when subjected to a compression force that compresses the microspheres to a thickness of up to about 50% of their original diameter or less.

Hollow microspheres also decrease the specific gravity of the gel material by creating gas pockets therein. In many cushioning applications, very low specific gravities are examples. The specific gravity of the example gel cushioning medium may range from about 0.06 to about 1.30, depending in part upon the amount and specific gravity of fillers and additives, including microspheres and foaming agents. In many cushioning applications of the methods and structures, a gel material having a specific gravity of less than about 0.50 is an example. When a gel material example for use in cushions according to the methods and structures includes the example microspheres, the microspheres must be dispersed, on average, at a distance of about one-and-a half (1.5) times the average microsphere diameter or a lesser distance from one another in order to achieve a specific gravity of less than about 0.50. A specific gravity of less than about 0.30 is an example for use in some cushions according to the methods and structures. Other formulations of the example gel material have specific gravities of less than about 0.65, less than about 0.45, and less than about 0.25.

MICROPEARL and EXPANCEL acrylic microspheres are examples because of their highly flexible nature, as explained above, which tend not to restrict deformation of the thermoplastic elastomer. Glass, ceramic, and other types of microspheres may also be used in the thermoplastic gel material, but are less example.

d. Plasticizer Component

As explained above, plasticizers allow the midblocks of a network of triblock copolymer molecules to move past one another. Thus, Applicant believes that plasticizers, when trapped within the three dimensional web of triblock copolymer molecules, facilitate the disentanglement and elongation of the elastomeric midblocks as a load is placed on the network. Similarly, Applicant believes that plasticizers facilitate recontraction of the elastomeric midblocks following release of the load. The plasticizer component of the example gel cushioning medium may include oil, resin, a mixture of oils, a mixture of resins, other lubricating materials, or any combination of the foregoing.

i. Oils

The plasticizer component of the example gel material may include a commercially available oil or mixture of oils. The plasticizer component may include other plasticizing agents, such as liquid oligomers and others, as well. Both naturally derived and synthetic oils are useful in the example gel material. Preferably, the oils have a viscosity of about 70 SUS to about 500 SUS at about 100° F. Most examples for use in the gel material are paraffinic white mineral oils having a viscosity in the range of about 90 SUS to about 200 SUS at about 100° F.

One embodiment of a plasticizer component of the example gel includes paraffinic white mineral oils, such as those having the brand name DUOPRIME, by Lyondell Lubricants of Houston, TX, and the oils sold under the brand name TUFFLO by Witco Corporation of Petrolia, PA. For example, the plasticizer component of the example gel may include paraffinic white mineral oil such as that sold under the trade name LP-150 by Witco.

Paraffinic white mineral oils having an average viscosity of about 90 SUS, such as DUOPRIME 90, are examples for use in other embodiments of the plasticizer component of the example gel cushioning medium. Applicant has found that DUOPRIME 90 and oils with similar physical properties can be used to impart the greatest strength to the example gel material.

Other oils are also useful as plasticizers in compounding the gel material. Examples of representative commercially available oils, include processing oils such as paraffinic and naphthenic petroleum oils, highly refined aromatic-free or low aromaticity paraffinic and naphthenic food and technical grade white petroleum mineral oils, and synthetic liquid oligomers of polybutene, polypropene, polyterpene, etc., and others. The synthetic series process oils are oligomers that are permanently fluid liquid non-olefins, isoparaffins or paraffins. Many such oils are known and commercially available. Examples of representative commercially available oils include Amoco polybutenes, hydrogenated polybutenes and polybutenes with epoxide functionality at one end of the polybutene polymer. Examples of such Amoco polybutenes include: L-14 (320 $M_n$), L-50 (420 $M_n$), L-100 (460 $M_n$), H-15 (560 $M_n$), H-25 (610 $M_n$), H-35 (660 $M_n$), H-50 (750 $M_n$), H-100 (920 $M_n$), H-300 (1290 $M_n$), L-14E (27-37 cst @100° F viscosity), L-300E (635-690 cst @210° F. viscosity), Actipol E6 (365 $M_n$), E16 (973 $M_n$), E23 (1433 $M_n$) and the like. Examples of various commercially available oils include: Bayol, Bernol, American, BLANDOL, DRAKEOL, ERVOL, Gloria, KAYDOL, Litetek, MARCOL, PAROL, PENETECK, Primol, PROTOL, SONTEX, and the like.

ii. Resins

Resins useful in the plasticizer component of the example gel material include, but are not limited to, hydrocarbon-derived and rosin-derived resins having a ring and ball softening point of up to about 150° C., more preferably from about 0° C. to about 25° C., and a weight average molecular weight of at least about 300.

For use in many of the cushions according to the methods and structures, Applicant prefers the use of resins or resin mixtures that are highly viscous flowable liquids at room temperature (about 23° C.). Plasticizers that are fluid at room temperature impart softness to the gel material. Although room temperature flowable resins are examples, resins that are not flowable liquids at room temperature are also useful in the material.

The resins most example for use in the example gel material have a ring and ball softening point of about 18° C.; melt viscosities of about 10 poises (ps) at about 61° C., about 100 ps at about 42° C., and about 1,000 ps at about 32° C.; an onset $T_g$ of about –20° C.; an MMAP value of 68° C.; a DACP value of 15° C.; an OMSCP value of less than –40° C.; a $M_n$ of about 385; a $M_w$ of about 421; and a $M_z$ of about 463. One such resin is marketed as REGALREZ 1018 by Hercules Incorporated of Wilmington, DE. Variations of REGALREZ 1018 that are useful in the example cushioning material have viscosities including, but not limited to, 1025 stokes, 1018 stokes, 745 stokes, 114 stokes, and others.

Room temperature flowable resins that are derived from poly-β-pinene and have softening points similar to that of REGALREZ 1018 are also useful in the plasticizer component of the example cushioning medium. One such resin, sold as PICCOLYTE S25 by Hercules Incorporated, has a softening point of about 25° C.; melt viscosities of about 10 ps at about 80° C., about 100 ps at about 56° C. and about 1,000 ps at about 41° C.; an MMAP value of about 88° C.; a DACP value of about 45° C.; an OMSCP value of less than about –50° C.; an $M_z$ of about 4,800; an $M_w$ of about 1,950; and an $M_n$ of about 650. Other PICCOLYTE resins may also be used in the example gel material.

Another room temperature flowable resin that is useful in the plasticizer component of the example material is marketed as ADTAC LV by Hercules Incorporated. That resin has a ring and ball softening point of about 5° C.; melt viscosities of about 10 ps at about 62° C., about 100 ps at about 36° C. and about 1,000 ps at about 20° C.; an MMAP value of about 93° C.; a DACP value of about 44° C.; an OMSCP value of less than about –40° C.; a $M_z$ of about 2,600; a $M_w$ of about 1,380; and a $M_n$ of about 800.

Resins such as the liquid aliphatic C-5 petroleum hydrocarbon resin sold as WINGTACK 10 by the Goodyear Tire & Rubber Company of Akron, OH, and other WINGTACK resins are also useful in the gel material. WINGTACK 10 has a ring and ball softening point of about 10° C.; a Brookfield Viscosity of about 30,000 cps at about 25° C.; melt viscosities of about 10 ps at about 53° C. and about 100 ps at about 34° C.; an onset $T_g$ of about –37.7° C.; an $M_n$ of about 660; an $M_w$ of about 800; a 1:1 polyethylene-to-resin ratio cloud point of about 89° C.; a 1:1 microcrystalline wax-to-resin ratio cloud point of about 77° C.; and a 1:1 paraffin wax-to-resin ratio cloud point of about 64° C.

Resins that are not readily flowable at room temperature (i.e., are solid, semi-solid, or have an extremely high viscosity) or that are solid at room temperature are also useful in the example gel material. One such solid resin is an aliphatic C-5 petroleum hydrocarbon resin having a ring and ball softening point of about 98° C.; melt viscosities of about 100 ps at about 156° C. and about 1000 ps at about 109° C.; an onset $T_g$ of about 46.1° C.; an $M_n$ of about 1,130; an $M_w$ of about 1,800; a 1:1 polyethylene-to-resin ratio cloud point of about 90° C.; a 1:1 microcrystalline wax-to-resin ratio cloud point of about 77° C.; and a 1:1 paraffin wax-to-resin ratio cloud point of about 64° C. Such a resin is available as WINGTACK 95 and is manufactured by Goodyear Chemical Co.

Polyisobutylene polymers are an example of resins that are not readily flowable at room temperature and that are useful in the example gel material. One such resin, sold as VISTANEX LM-MS by Exxon Chemical Company of Houston, TX, has a $T_g$ of –60° C., a Brookfield Viscosity of about 250 cps to about 350 cps at about 350° F., a Flory molecular weight in the range of about 42,600 to about 46,100, and a Staudinger molecular weight in the range of about 10,400 to about 10,900. The Flory and Staudinger methods for determining molecular weight are based on the intrinsic viscosity of a material dissolved in diisobutylene at 20° C.

Glycerol esters of polymerized rosin are also useful as plasticizers in the example gel material. One such ester, manufactured and sold by Hercules Incorporated as HERCULES Ester Gum 10D Synthetic Resin, has a softening point of about 116° C.

Many other resins are also suitable for use in the gel material. In general, plasticizing resins are examples that are compatible with the B block of the elastomer used in the material and non-compatible with the A blocks.

In some embodiments of the cushion according to the methods and structures, tacky materials may be desirable. In such embodiments, the plasticizer component of the gel material may include about 20 weight percent or more, about 40 weight percent or more, about 60 weight percent or more, or up to about 100 weight percent, based upon the weight of the plasticizer component of a tackifier or tackifier mixture.

iii. Plasticizer Mixtures

The use of plasticizer mixtures in the plasticizer component of the example gel material is useful for tailoring the physical characteristics of the example gel material. For example, characteristics such as durometer, tack, tensile strength, elongation, melt flow and others may be modified by combining various plasticizers.

For example, a plasticizer mixture that includes at least about 37.5 weight percent of a paraffinic white mineral oil having physical characteristics similar to those of LP-150 (a viscosity of about 150 SUS at about 100° F., a viscosity of about 30 centistokes (cSt) at about 40° C., and maximum pour point of about −35° F.) and up to about 62.5 weight percent of a resin having physical characteristics similar to those of REGALREZ 1018 (such as a softening point of about 20° C.; an onset $T_g$ of about −20° C.; an MMAP value of about 70° C.; a DACP value of about 15° C.; an OMSCP value of less than about −40° C.; and an $M_w$ of about 400), all weight percentages being based upon the total weight of the plasticizer mixture, could be used in a gel cushioning medium. When compared to a material plasticized with the same amount of an oil such as LP-150, the material that includes the plasticizer mixture has decreased oil bleed and increased tack.

Applicant believes that, when resin is included with oil in a plasticizer mixture of the example gel for use in cushions according to the methods and structures, the material exhibits reduced oil bleed. For example, a formulation of the material that includes a plasticizing component that has about three parts plasticizing oil (such as LP-150), and about five parts plasticizing resin (such as REGALREZ 1018) exhibits infinitesimal oil bleed at room temperature, if any, even when placed against materials with high capillary action, such as paper. Prior art thermoplastic elastomers bleed noticeably under these circumstances.

The plasticizer:block copolymer elastomer ratio, by total combined weight of the plasticizer component and the block copolymer elastomer component, of the example gel cushioning material for use in the cushions of the methods and structures ranges from as low as about 1:1 or less to higher than about 25:1. In applications where plasticizer bleed is acceptable, the ratio may as high as about 100:1 or more. Especially example are plasticizer:block copolymer ratios in the range of about 2.5:1 to about 8:1. An example ratio, such as 5:1, provides the desired amounts of rigidity, elasticity and strength for many typical applications. Another example plasticizer to block copolymer elastomer ratios of the example gel material is 2.5:1, which has an unexpectedly high amount of strength and elongation.

Applications

The methods and structures herein described apply to molding thermoplastic parts of various sizes but are particularly useful for economically molding large thermoplastic or gelatinous parts. In another aspect of the methods and structures, thermoplastic parts that are too soft to be ejected from injection molds by the usual ejector pin method can be molded by the methods and structures. By way of example, an open grate structure 2 m long and 1 m wide by 40 mm deep would require a highly expensive and very complex injection mold, and would require a very large and expensive injection molding machine. The same grate could possibly be made by profile extrusion, but the complexity of the task would discourage those skilled in the art. In addition, the size of the die would be prohibitive. The methods and structures provide less complexity of construction and less costly while still producing excellent quality parts without knit lines common in injection molding.

In yet another aspect of the methods and structures, thermoplastic material may be used. When a rigid material is used, the part must be mechanically pushed from the mold by ejector pins or other means. In still another aspect of the methods and structures, gelatinous materials may be used. When gelatinous elastomeric material is used, the molded part can be pulled from the mold by pulling or stretching the part until it comes free from the mold.

The methods and structures will work with rigid or soft highly elongatable gels or materials with elasticity in between.

While the methods and structures have been described and illustrated in conjunction with a number of specific configurations, those skilled in the art will appreciate that variations and modifications may be made without departing from the principles herein illustrated, described, and claimed. The methods and structures, as defined by the appended claims, may be embodied in other specific forms without departing from their spirit or essential characteristics. The configurations described herein are to be considered in all respects as only illustrative and not restrictive. All changes that come within the meaning and range of equivalency of the claims are to be embraced within their scope.

The invention claimed is:

1. A screed mold method for making gelatinous elastomer gel cushioning articles, the method comprising the steps of:
   attaching side rails around a perimeter of an open face screed mold, the screed mold including a plurality of crisscrossing slots in a rigid body forming a honeycomb shape defining at least one mold core,
   providing a separate injection head, the injection head having a plurality of distribution channels therein through which thermoplastic material may flow, and including at least one heating element within it for heating thermoplastic material,
   positioning the injection head adjacent the screed mold so that thermoplastic material may flow from the distribution channels into at least one of the plurality of crisscrossing slots,
   utilizing a pumping source to introduce thermoplastic material into the injection head, and using the plurality of distribution channels of the injection head to deliver thermoplastic material into at least one of the plurality of crisscrossing slots in the screed mold,
   displacing the screed mold and the injection head relative to each other causing the thermoplastic material to be level, and
   recovering molded and cooled thermoplastic material from the screed mold in a desired geometric shape of a cushioning element.

2. The method as recited in claim 1, wherein recovering includes periodically terminating pumping of the thermoplastic material into the screed mold, and during such period of termination, removing molded thermoplastic material from the screed mold.

3. The method as recited in claim 1, wherein utilizing a pumping source to introduce the thermoplastic material into the injection head is a continuous process, and molded thermoplastic material is recovered from one part of the screed mold as unmolded thermoplastic material is delivered into at least one of the plurality of crisscrossing slots in another part of the screed mold.

4. The method as recited in claim 1, wherein recovering molded and cooled thermoplastic material from the screed mold comprises cutting it as it exits one part of the screed mold as new thermoplastic material is delivered into another part of the screed mold.

5. The method as recited in claim 1, wherein including a plurality of crisscrossing slots in a rigid body forming a honeycomb shape defining at least one mold core comprises cutting at least some of the plurality of crisscrossing slots not more than 80% of the way through the rigid body.

6. The method as recited in claim 1, wherein including a plurality of crisscrossing slots in a rigid body forming a honeycomb shape defining at least one mold core comprises cutting at least some of the plurality of crisscrossing slots all the way through the rigid body.

7. The method as recited in claim 1, wherein including a plurality of crisscrossing slots in a rigid body forming a honeycomb shape defining at least one mold core comprises forming the plurality of crisscrossing slots by bolting square or rectangular blocks to a base plate.

8. The method as recited in claim 1, wherein including a plurality of crisscrossing slots in a rigid body forming a honeycomb shape defining at least one mold core comprises cutting the plurality of crisscrossing slots in a non-metallic rigid body.

9. The method as recited in claim 1, wherein including a plurality of crisscrossing slots in a rigid body forming a honeycomb shape defining at least one mold core comprises cutting the rigid body so that at least some of the plurality of crisscrossing slots cross each other in an "X" configuration.

10. The method as recited in claim 1, wherein including a plurality of crisscrossing slots in a rigid body forming a honeycomb shape defining at least one mold core comprises cutting the rigid body so that at least some of the plurality of crisscrossing slots cross each other in a "+" configuration.

11. The method as recited in claim 1, wherein including a plurality of crisscrossing slots in a rigid body forming a honeycomb shape defining at least one mold core comprises sizing the plurality of crisscrossing slots to permit the thermoplastic material to flow therethrough when heated.

12. The method as recited in claim 1, further comprising providing a separate injection head including at least one cooling channel.

13. The method as recited in claim 1, further comprising establishing a desired distance between the injection head and the screed mold prior to flow of the thermoplastic material.

14. The method as recited in claim 1, wherein utilizing a pumping source to introduce thermoplastic material into the injection head comprises introducing an A-B-A triblock copolymer.

15. The method as recited in claim 14, wherein utilizing a pumping source to introduce thermoplastic material into the injection head comprises introducing a thermoplastic material including a plasticizer.

16. A screed mold method for making gelatinous elastomer gel cushioning articles, the method comprising the steps of:
providing an open face screed mold having a structural shape in a rigid body in which gel may be formed to take on a desired geometric structure, the structural shape including crisscrossing slots in the rigid body,
positioning an injection head, having a plurality of distribution channels therein through which thermoplastic material may flow,
in close proximity to the screed mold,
utilizing a pumping source to deposit thermoplastic material into the injection head, and distributing the thermoplastic material through the plurality of distribution channels of the injection head, out of at least one exit port of the injection head, into at least one of the crisscrossing slots in the screed mold,
causing the screed mold and the injection head to move relative to each other as the thermoplastic material is deposited into the crisscrossing slots, and
receiving a cushioning element molded by the screed mold.

17. The method as recited in claim 16, wherein receiving a cushioning element includes periodically terminating pumping of the thermoplastic material into the screed mold, and during such period of termination, removing molded thermoplastic material from the screed mold.

18. The method as recited in claim 16, wherein utilizing a pumping source to deposit thermoplastic material is a continuous process, and molded thermoplastic material is recovered from one part of the screed mold as unmolded thermoplastic material is distributed into another part of the screed mold.

19. The method as recited in claim 16, wherein receiving a cushioning element molded by the screed mold comprises cutting a portion of the cushioning element as it exits one part of the screed mold due to new thermoplastic material being distributed into another part of the screed mold.

20. The method as recited in claim 16, wherein providing an open face screed mold having a structural shape in a rigid body in which gel may be formed to take on a desired geometric structure, the structural shape including crisscrossing slots in the rigid body, comprises cutting at least some of the crisscrossing slots not more than 80% of the way through the rigid body.

21. The method as recited in claim 16, wherein providing an open face screed mold having a structural shape in a rigid body in which gel may be formed to take on a desired geometric structure, the structural shape including crisscrossing slots in the rigid body, comprises cutting at least some of the crisscrossing slots all the way through the rigid body.

22. The method as recited in claim 16, wherein providing an open face screed mold having a structural shape in a rigid body in which gel may be formed to take on a desired geometric structure, the structural shape including crisscrossing slots in the rigid body, comprises forming the crisscrossing slots by bolting square or rectangular blocks to a base plate.

23. The method as recited in claim 16, wherein providing an open face screed mold having a structural shape in a rigid body in which gel may be formed to take on a desired geometric structure, the structural shape including crisscrossing slots in the rigid body, comprises forming a structural shape in a non-metallic rigid body.

24. The method as recited in claim 16, wherein providing an open face screed mold having a structural shape in a rigid body in which gel may be formed to take on a desired geometric structure, the structural shape including crisscrossing slots in the rigid body, comprises patterning the rigid body such that at least some of the crisscrossing slots cross each other in an "X" configuration.

25. The method as recited in claim 16, wherein providing an open face screed mold having a structural shape in a rigid body in which gel may be formed to take on a desired geometric structure, the structural shape including crisscrossing slots in the rigid body, comprises patterning the rigid body such that at least some of the crisscrossing slots cross each other in a "+" configuration.

26. The method as recited in claim 16, wherein providing an open face screed mold having a structural shape in a rigid body in which gel may be formed to take on a desired geometric structure, the structural shape including crisscrossing slots in the rigid body, comprises sizing the crisscrossing slots to permit the thermoplastic material to flow therethrough when heated.

27. The method as recited in claim 16, further comprising positioning an injection head including at least one cooling channel.

28. The method as recited in claim 16, further comprising establishing a desired distance between the injection head and the screed mold prior to flow of the thermoplastic material.

29. The method as recited in claim 16, wherein utilizing a pumping source to deposit thermoplastic material into the injection head includes depositing the thermoplastic material including an A-B-A triblock copolymer.

30. The method as recited in claim 16, wherein utilizing a pumping source to deposit thermoplastic material includes depositing the thermoplastic material including a plasticizer.

* * * * *

UNITED STATES PATENT AND TRADEMARK OFFICE
CERTIFICATE OF CORRECTION

PATENT NO. : 7,666,341 B2 Page 1 of 1
APPLICATION NO. : 10/775043
DATED : February 23, 2010
INVENTOR(S) : Tony M. Pearce It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1203 days.

Signed and Sealed this

Twenty-eighth Day of December, 2010

David J. Kappos
*Director of the United States Patent and Trademark Office*